United States Patent [19]

Bryant

[11] 4,185,582

[45] Jan. 29, 1980

[54] DISTRESS GAS GENERATING SIGNAL BALLOON APPARATUS

[76] Inventor: Clyde C. Bryant, 1920 Forrest Ave., East Point, Ga. 30344

[21] Appl. No.: 831,120

[22] Filed: Sep. 7, 1977

[51] Int. Cl.[2] .......................... B64B 1/40; G09F 9/00

[52] U.S. Cl. .......................... 116/210; 73/514; 116/DIG. 9; 343/18 B

[58] Field of Search ............ 116/124 B, DIG. 9, 210, 116/209; 9/9, 321, 324

[56] References Cited

U.S. PATENT DOCUMENTS

| | | | |
|---|---|---|---|
| 1,240,686 | 9/1917 | De Luca | 9/321 X |
| 2,825,803 | 3/1958 | Newbrough | 116/124 B X |
| 2,836,143 | 5/1958 | Shofi | 116/124 B |
| 3,461,835 | 8/1969 | Cockbill et al. | 9/321 X |
| 3,626,764 | 12/1971 | Prachar | 73/514 |
| 3,721,983 | 3/1973 | Sherer | 116/124 B |
| 3,746,285 | 7/1973 | Mango | 116/124 B |
| 3,945,338 | 3/1976 | Correa | 116/124 B |

FOREIGN PATENT DOCUMENTS

| | | | |
|---|---|---|---|
| 1133254 | 11/1968 | United Kingdom | 116/210 |

*Primary Examiner*—Daniel M. Yasich

*Attorney, Agent, or Firm*—Gipple & Hale

[57] ABSTRACT

A distress signal device comprising an inflatable balloon, a tether line with one end attached to the balloon and its other end attached to a casing and a gas cartridge or vial containing water or ammonium halide solution and metal hydride crystals located within the casing. A cartridge actuator apparatus is also provided which comprises a spring loaded pin axially aligned with the end of the glass vial, a line connected to a blunt end of the pin with the other end of the line being looped around an inclined leg of a support member connected to the inner side wall of the casing and a rod. A ball weight is connected by a universal joint to the lower end of the rod, and coil springs are located between the inner casing wall and the ball weight on all sides so that upon an impact of predetermined force the ball weight moves a sufficient distance to release the rod causing the pin to puncture the glass vial to allow mixing of the liquid and crystals to inflate the balloon. The balloon is released from the casing by a release mechanism allowing the balloon to rise into the atmosphere.

15 Claims, 7 Drawing Figures

SOLENOID MASS

DISTRESS GAS GENERATING SIGNAL BALLOON APPARATUS

BACKGROUND OF THE INVENTION

This invention generally relates to an automatic signal device for hikers, campers, plane crash victims and the like. More specifically, this invention is a signal device which indicates an accident or emergency site by the utilization of a simple inflatable balloon or series of color coded balloons.

Pilots who fly over jungles or large bodies of water desire a failsafe signaling device to indicate a crash site in cases of emergency. This signaling device should be used in conjunction with presently existing homing devices. This is desirable because the radio homing devices often fail as a result of the crash. If the present invention were utilized, then the wrecked plane site could be viewed for many miles. Signal devices of various types have been used for centuries to indicate emergency areas. Recently, air inflated balloons have been utilized by skin divers in the ocean to indicate their exact location.

The invention also contemplates the use of a crash force sensor which will activate the automatic signal device when a predetermined force from a particular angle with respect to the activator is absolved.

The crash force sensor activator contemplates fulfilling the need for a better crash sensor for activating Electronic Locator Transmitters (ELTs) which are now mandatory on all planes in the United States.

DESCRIPTION OF THE PRIOR ART

Many devices and methods have been utilized by crash victims in attempts to indicate their exact sites to rescuers. Among these methods were included such simple means as the surviving persons collecting wood and setting the same on fire to enable the rescue plane to view the crash area. This is obviously a primitive method and besides requiring possibly injured victims to gather wood it also wastes the burning wood as a signal means in lieu of conserving the wood for heating purposes. The present invention is an entirely self-contained and ready-to-use signal system which requires the victim to break a glass vial, or in its automatic mode with an inertial activation system sends a distress signal which is visible or detectable for miles.

Flares have also been useful in locating crash areas. The main difficulty with flares however is that they only last for a limited period of time. When a signal flare finishes its burn there is obviously nothing left for rescuers to see in order to locate the crash site. The present invention utilizes a colored balloon or series of balloons to indicate an emergency area, which balloons will remain aloft indefinitely to indicate the crash area.

SUMMARY OF THE INVENTION

The present invention utilizes a glass vial filled with water or an ammonium halide solution surrounded with dry crystals of a metal hydride such as calcium hydride, which may be manually punctured, by being shock activated, or activated by a solenoid. The released gas from the vial fills up a thick skinned balloon or plastic bag such as Mylar. The balloon is then carried upward by its enclosed light gas to a height equal to the length of wire or line wrapped around a rotating spool of the signal device. The balloon is preferably colored brightly and lined with foil or stips of foil to facilitate both visual and radar detection. The balloon, floating in the atmosphere, can be easily spotted by a recovery plane or helicopter flying at a height approximately equal to the known height of the balloon. Since the balloons will always be anchored to the ground or water surface and since all of their tether lines would be of the same length, the recovery vehicles would only have to consider the prevailing windspeed, hence the angle created between the tether line and ground, to calculate the expected balloon altitude. The fact that the length of the tethered line is known allows the recovery planes or vehicles to search at a known height for the balloons and therefore further facilitates the search.

In using the manually activated design for aircraft, several of the balloons could be color coded and when an aircraft was about to crash, a red one, for example, could be tossed out, then a green, and a yellow, etc. This would indicate to searching planes exactly the path the plane was traveling just before it crashed. Subsequently, the automatic inertial activated balloon located on the plane would pinpoint the exact crash site.

A casing holding a vial of ammonium halide solution or water surrounded with metal hydrides has an opening on one end and a threaded nut with pin on the other end. The casing is threaded on its upper or open end to receive a threaded cap with a check valve and an attached balloon. A long line attaches the balloon to the case and is stored on a spool around the body of the inner case. A slot located in the outer wall of the case dispenses the previously wrapped line in a tangle free manner. The casing is constructed such that it separates near its center in order to facilitate replacement of the line, spool, cartridge of gas and balloon.

In operation the nut is turned until the glass vial is broken and gas flows in a channel past the cylinder, through the check valve and into the balloon or bag. After the balloon is sufficiently inflated the cap is then automatically pressure released or manually screwed to release the captive balloon. The long line in the vase then pays out and the balloon rises to give a readily visible or detectable distress signal. The case is attached to any stationary object by a hook located on the lower end of the case to prevent drift.

The balloon, line and vial of ammonium halide or water and crystals are all replaceable to make the system serviceable and reuseable.

For use in an emergency by an airplane, the device could be activated and tossed from the plane just before it touched the ground. A heavy weight would anchor the casing at the spot the plane crashed.

An alternate design is disclosed for fixed installation on an aircraft. The release mechanism is an inertial system which will automatically activate the balloon when the shock of landing exceeds a specified number of "G's" force.

These devices would be inexpensive in cost allowing every plane to have several of the hand activated devices and several of the body mounted devices.

Another embodiment illustrates an alternate method of activating the balloon. In order to lessen the chance of damage to the signal apparatus in a crash the entire unit is released from the body of the plane by the inertia release mechanism at the first shock of impact. The device casing simply falls to the ground and the activated balloon ascends from the site of the first impact.

The preferred embodiment is disclosed wherein the gas is generated by a glass vial of ammonium halide solution or water and the casing around the vial is filled with metal hydride crystals. In activation when the vial is broken hydrogen gas is generated which quickly fills the balloon or bag.

DETAILED DESCRIPTION OF THE DRAWINGS

Figures 1, 2, 3:
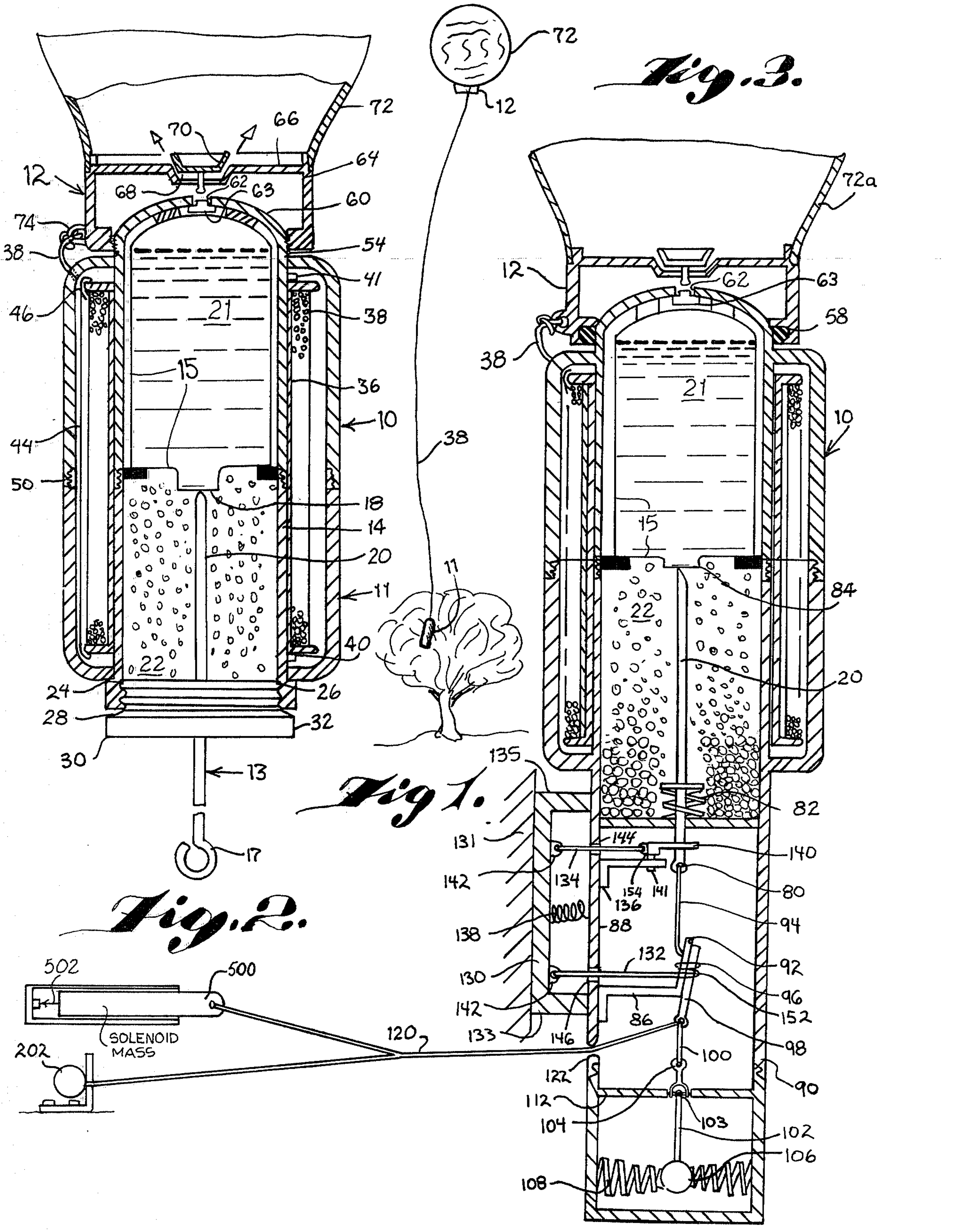
FIG. 1 illustrates the emergency distress signal device after it has been activated.
FIG. 2 is a cross-sectional view of the preferred embodiment of the distress signal device.
FIG. 3 is a cross-sectional view of an alternate embodiment of the automatic distress signal device.

An automatic distress signal balloon, generally indicated as 10, consists of a casing 11, a cap 12, and a spring clip 13. An inner case 14 is cylindrical in shape and of sufficient internal diameter so as to allow a glass vial 15 to be held within its walls. The vial would be filled with a solution 21. Also contained by inner casing 14 adjacent to vial 15 are metal hydride crystals 22.

A pin 20 can break the vial and allow mixing of the liquid and crystals. The pin 20 is axially aligned with respect to the vial 15 with one sharp piercing end being adjacent the thin end 18 of the glass vial and the other end being connected to an actuator knob assembly 32. The upper portion or the actuator knob assembly 32 has outside threads 26 which matingly engage with interior threads 24 on the inside wall of inner casing 14 and at the inner casing's lower edge. The lower portion of the actuator knob assembly 32 consists of a knurled knob 30. A rubber gasket 28 fits over the outside threads 26 of the actuator knob assembly. The rubber gasket is prevented from being inadvertantly removed by the upper flat surface of the knurled knob 30. The gasket is flanged upwardly and downwardly and serves to prevent any gas from escaping through the area defined by the bottom of the inner casing and the actuator knob assembly.

In operation, when the distress signal device is to be activated, the operator merely screws the knurled knob 30 until the pin 20 breaks the vial of water or ammonium halide solution. In this manner, pressurized gas is generated by the mixing of the chemicals. A spring clip 13 is also attached to the actuator knob assembly 32 which serves to provide a hook for the device to be held on to a hiker's belt or other suitable holding spot. The spring clip has a lower hook portion 17 which is metal or plastic and is useful for attaching and holding the distress signal device to other stationary objects.

The inner casing 14 carries a spool 36 around its exterior wall. A tight line or wire 38 is wrapped around the spool. The tether line can be a light line or it can be a metallic wire which could be used as an antenna for the plane's Electronic Locator Transmitter. The spool is able to freely rotate around the inner casing and consequently it is able to dispense the wire or line wrapped about it. The exterior wall of the inner casing is provided with circular flanges 40 and 41 which serve to provide a stop for the spool's relative vertical placement about the inner casing.

The surface of the casing 50 is provided with a long longitudinal slot 44. This slot 44 extends along the length of the casing and provides a trackway for the line to pay out. This allows the wire to be dispensed in a tangle free manner. The end 46 of the wire 38 is tied or otherwise secured to the spool 36.

The outer casing 50 is cylindrical in shape and is of suitable size to surround the rotating spool 36. The outer casing can be made of two screw together parts so that a spool of wire or line can be replaced easily. The outer casing is appropriately secured to the exterior wall of the inner casing 14.

The exterior cap threads 54 extend from the area of the inner casing 14 immediately above the upper surface of the outer casing 50. These exterior cap threads 54 matingly engage with interior cap threads 56. The two sets of threads serve to secure the cap 12 to the casing assembly 11. In an alternative embodiment, the screw threads are replaced by snap seals 58 which also serve to secure the cap 12 to the casing assembly 11. The cap, in association with screw threads or snap seals, comprises a release means for separating the balloon 72 from the casing 50 when the balloon is inflated to a predetermined pressure, in a manner to be hereinafter described. The cap is at all times attached to the balloon, and will rise with the balloon when the balloon is inflated and released.

The top portion of inner casing 14 is partially closed by circular concave wall 60. The concave wall 60 serves to prevent the rear end of the glass vial 15 from moving during the period of time that gas is released and also defines a circular hole 62 through which the gas is passed when the distress signal is activated. A filter 63 covers hole 62 and filters the gas as it passes through it. The lower end of the concave wall connects to the upper exterior edge of the inner casing 14.

The cap 12 consists of a cylindrical ring 64. The lower portion of the ring 64 is provided with the aforementioned interior cap threads 56 or snap seals 58. A circular plate 66 extends interiorly from the middle of the internal wall of the cylindrical ring 64. The circular plate defines a central hole 68 through which check valve 70 is inserted and held in place. The check valve is normally in the closed position and only allows gas to pass through the central hole 68 in an upward direction. When the gas pressure coming through hole 62 of the inner casing 14 is sufficient, then the gas passes by the check valve 70 and through the central hole 68. When a sufficient quantity of gas inflates the balloon, the check valve 70 prevents the gas from escaping.

A thick balloon, elastic material or plastic bag 72 has its circular shaped opening connected to the exterior wall of the cap 12. The balloon material 72 completely covers the circular plate 66 and is directly secured to the perimeter edge of the circular plate 66 by suitable attaching means. The balloon or elastic material 72 is lined with foil or foil strips which facilitate radar detection. Similarly, the balloon can be colored any color to help visual detection. A tie ring 74 is secured to the bottom outside edge of the cap 12 which serves as a convenient place to tie the other end of the line or wire 38.

Preparation of the distress signal proceeds as follows: A glass vial of solution is slid within the inner casing by unscrewing the inner casing and sliding the vial through the opening. The vial is placed within the inner casing so that its thin glass wall is directed towards the actuator knob assembly. The rear curved portion of the vial is placed flush against the curved wall 60 of the inner casing. The lower section of the case is then screwed back into place. The actuator knob assembly is deliberately not screwed tightly into the inner casing because to do so would inadvertently break the glass vial. Therefore, the actuator knob assembly is only screwed in a sufficient amount so as to secure the assembly to the casing. While the outer casing 50 is separated the spool 36, with a measured length of line or wire wrapped about it is placed around the outer wall of the inner case. One loose end of the wire 38 is passed through the slot 44, and subsequently tied to the ring 74 of the cap. The outer end of the wire or line is tied to the spool 36 located within the outer casing. Next, the metal hydride crystals are placed in the lower section of the casing below the vial of solution. While these chemicals will provide rapid inflation of the balloon or plastic bag, the chemical compositions disclosed in U.S. Pat. Nos. 3,674,702 and 3,786,139 can be utilized if a slower reaction is desired. Consequently, a ready to use automatic distress signal balloon is set up such that an operator need only perform an actuation step to display the signal balloon.

In operation, the operator turns the knurled knob 30 a sufficient number of times so that the vial 15 is broken by the pin 20. The reactants mix and produce a gas which passes upwardly through hole 62 of the inner casing. The pressurized gas will not pass out of the bottom of the device because the rubber gasket 28 provides a seal between the inner casing and the knurled knob. Additionally, the gas vial cannot move backwardly due to the curved wall 60 restraining the gas cartridge's relative rearward movement. The gas passes through hole 62 and is of sufficient pressure so as to pass through the normally closed check valve 70 and through the central hole 68 of circular plate 66. Consequently, the balloon will start to fill up due to the incoming pressure of gas. When the balloon is of a sufficient size the operator will either unscrew the cap from the inner casing or the cap will "pop" off the inner casing at the pressure point that the snap seals 58 are intended to release. The automatic "popping" off of the cap will occur when the pressure of gas within the balloon of the cap is sufficient to release the cap from the inner casing. Once the cap is removed, by whichever method the check valve will prevent the gas within the area defined by the circular plate and balloon from escaping. The balloon and cap assembly will then tend to rise due to the density of the gas contained within the balloon. The line of the spool, one end of which is attached to the cap, will unwind itself from the spool in the tangle free manner due to the fact that the line slides vertically in slot 44. When the spool is totally unwound, the balloon is at a predetermined height equal to the length of the wire or line originally wrapped around the spool. Consequently, the cap and gas filled balloon will be tethered to the inner casing. The entire device can than either be hand held or more practically secured to a tree branch or other stationary object in order to anchor the distress signal. The rescue planes, helicopters or other rescue devices could then fly at an altitude approximately equal to the known height of the line or wire supporting the balloon. The fact that the balloons are colored and/or filled with foil strings facilitates radar or visual search.

The balloon, lines and glass vials are all replaceable to make the system serviceable and reuseable.

For use in an emergency, the device could be activated and tossed from the plane just before it touches the ground. A heavy weight would serve to anchor the case at the spot the plane crashed.

The practicality of using a series of these balloon distress signals can be demonstrated in the following situation. A plane is lost and one of the search planes finds a colored balloon, i.e., red, green, yellow or orange balloon, floating in the air. Another plane, or the same plane then finds a different color balloon. The two sightings tell the rescuers the exact direction that the lost plane was traveling since a certain color balloon precedes or follows another specified color. The rescuers follow the balloon path until they see the balloon or balloons (another color in the color code) rising directly from the crashed plane.

The best mode of the invention as shown in FIG. 3 is installed and initially fixed to the outside fuselage or tail fin of an aircraft. The release mechanism differs from the aforementioned and described manual actuator in that this device is an inertial system which will automatically activate the release of the gas to the balloon when the shock of landing exceeds a specified force. It will be appreciated that the embodiment of FIG. 3 is identical to that of FIG. 2 except the actuator knob assembly which ultimately causes a pin to break the vial is replaced by an inertial activator.

As best seen in FIG. 3, a pin 80 is spring loaded by spring 82. The pin is axially aligned with the thin end 84 of the glass vial 15. A connecting wire 94 connects the blunt end of pin 80 to an inclined support member 86. The inclined support member 86 extends from the inner side wall 88 of the inner casing extension 90. One end of the inclined support member 86 is secured to the inner side wall and its free end defines an inclined extension leg 92 which extends at an angle to the casing extension 90. The connecting wire 94 is secured to the blunt end of the pin 80. The other end of the connecting wire is provided with a loop 96 which is of a sufficiently large diameter so as to encircle the pin 98 after passing through a slot in the inclined extension leg 92. The release pin 98 is able to slide along the lower surface of the inclined extension leg 92. The weight, size, and position of the pin 98 ensures the fact that the loop 96 retains the actuator pin 80 in a "ready" position. If the pin 98 is removed from within the loop 96 of connecting wire 94 then the spring loaded pin 80 will break the vial containing the ammonium halide solution.

Another connecting wire 100 connects the bottom of pin 98 to the rod and weight assembly 102. The lower end of the connecting wire 100 connects to the top of the metal rod 104. The metal rod is free to rotate about universal joint 103. The universal joint 103 is located in circular plate 112. Rod 104 carries at its lower end a ball-shaped weight 106. The ball-shaped weight is kept at an equal distance from the side walls of the inner casing by four springs 108 all perpendicular to one another (two springs not being shown).

The degrees of unidirectional reaction of the weight to an applied force versus omnidirectional reaction can be varied by calculating the sizes of springs needed. For unidirectional operation the lateral and back springs should be much stronger than the leading one.

In operation, the shock of the crash will cause the ball weight 106 to swing against the force of the springs 108. The swinging motion causes the attached rod 104 to pivot about ball joint 103 and pull downwardly the pin 98. The movement of pin 98 from within the loop 96 of connecting wire 94 causes the spring loaded actuator pin 80 to break the vial containing the ammonium halide solution. The release of gas causes the balloon 72*a* to be filled in the same manner as the previously discussed embodiment.

The springs 108 holding the ball weight 106 are adjustable to allow some movement of the ball weight and yet allow activation of the distress signal at a preselected number of "g" forces as would occur in a plane crash.

The shock activated embodiment, illustrated in FIG. 3 could also be built so as to allow the activation to be performed manually as illustrated by pull ring 202 or by means of a solenoid apparatus 500. A solenoid connecting wire 120 could be provided which has one end attached to the lower end of release pin 98 at the same point where connecting wire 100 attaches to the release pin. The solenoid connecting wire passes through hole 122 located in the side wall of the inner casing extension 90. The free end of solenoid connecting wire 120 is connected to the aforementioned solenoid 500 so that the device may be activated by motion of said solenoid. The free end of solenoid connecting wire 120 may also be connected to a pull ring 202 for easy manual activation of the device. The pull ring 202 could be located exterior to the plane fuselage or interior of the cockpit.

A bracket 130 can be secured to the outside fuselage 131 of the plane body. The contact surfaces of the bracket are curved to match the exterior of the inner casing of the signal device such that the device rests within the curvature of the two resting or support portions 133 and 135. The signal device is held firmly to the plane bracket by two wire connectors 132 and 134 which attach to the bracket at loops 142 located between the support portions 133 and 135. A spring 138 is also located between the support portions 133 and 135 which tends to force the distress signal device away from the plane bracket when the wire connectors are released from within the inner casing as will be explained.

A keeper ring 152 of wire connector 132 is passed through a slot in the inclined extension leg 92 and encircles the release pin 98 at a point below loop 96. The wire connectors 132, 134 pass through holes 146, 144, respectively, formed in the side wall of the inner casing. An arm 140 generally L-shaped is attached and secured to pin 80. As pin 80 is moved so too is arm 140. The short leg 141 of the arm 140 extends downwardly as a cylindrical pin. The cylindrical pin passes through keeper ring 154 of wire connector 134 and then passes through a hole located in an "L" shaped bracket 136. Bracket 136 is secured to the interior side wall of the inner casing with one leg flush against the inner wall. The free end of the bracket 136 has a hole through which the cylindrical pin 141 of arm 140 may slide.

In operation, the intention of this embodiment is for the plane bracket to release the balloon distress signal from the side or bottom of the plane. When the shock of the plane causes release pin 98 to drop, through the unidirectional activator action of the system, or alternatively this can be done manually by an initiation line or connecting wire 120, the keeper ring 152 of wire connector 132 will no longer be held around pin 98. As previously described, the dropping motion of the release pin spring actuates pin 80 by the force of spring 82. As the pin 80 is caused to rise it vertically carries arm 140. Vertical movement of arm 140 with respect to stationary bracket 136 raises the cylindrical pin 141 of the arm from the hole in the bracket 136. Consequently, the keeper ring 154 of wire connector 134 is released. The spring 138 pushes the distress signal away from the plane bracket 130 whereupon the balloon will be filled and released without any interference from the plane body.

Figure 4:
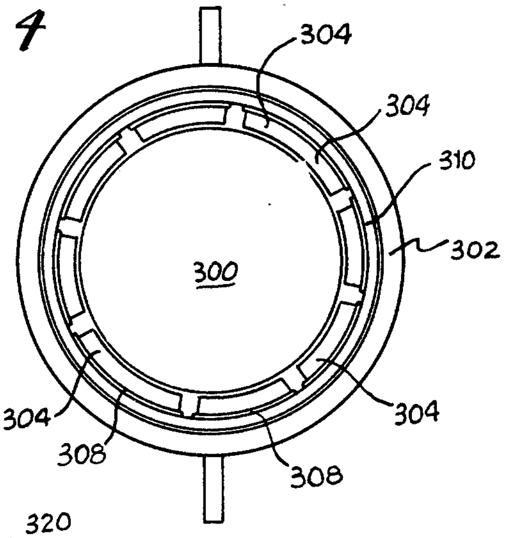
FIG. 4 is a cross-sectional view of the unidirectional inertia activator.
Figure 5:
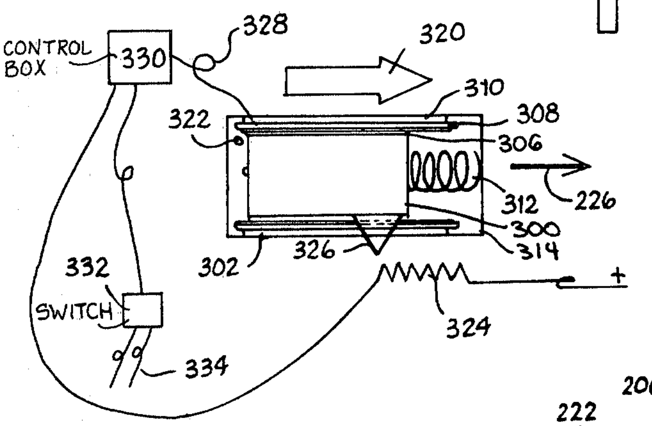
FIG. 5 is another cross-sectional view of the crash force sensor.
Figure 6:
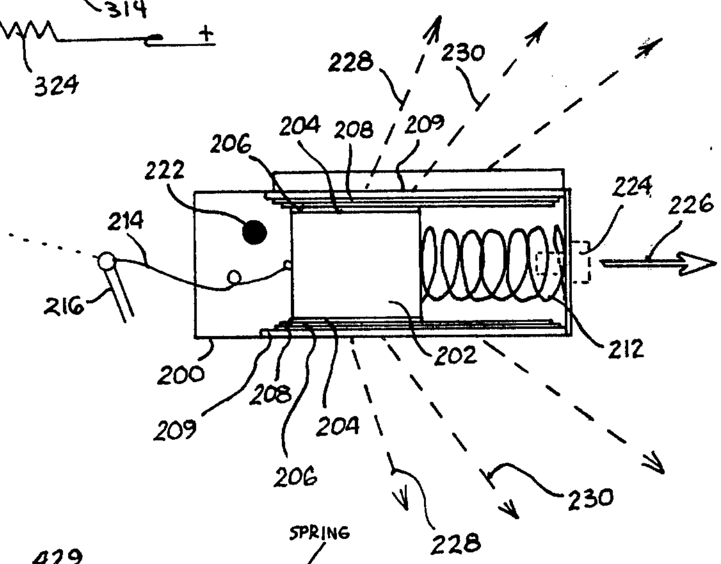
FIG. 6 is a cross-sectional view of an alternate embodiment of the crash force sensor.

FIGS. 4–6 illustrate an alternate method of activating the inflatable balloon or other rescue devices such as an ELT (Electronic Locating Transmitter). This embodiment of the invention is called the crash force sensor.

As best seen in FIGS. 4 and 5, a compact cylindrical seismic mass 300, made of or covered with a particular friction material, is held within a cylindrical casing 302. Surrounding the mass yet spaced apart are friction plates 304. Behind the friction plates 304 are located pressure plates 308. Pressure plates 308 further surround and extend over the edge of the friction plates 304. Thus it can be seen that the compact mass 300 is able to slide along its axis within the cylindrical casing 302. The ease with which the mass will slide is not dependent upon the amount of friction provided by friction pads and friction plates upon the mass, but upon the angle of the force received. A thin elastic layer 310 completely encircles the friction plates 304 and pressure plates 308. The thin elastic layer serves to keep the friction material constantly in contact with the mass. A spring 312 is provided, which in its preferred embodiment is calibrated to withstand any desired (x) number of Gs force. The spring is interposed between the front wall 314 of the casing 302 and the cylindrical mass 300. Arrow 320 indicates the direction of travel and direction of a reaction force of the seismic mass to the shock action of a head-on crash. It can thus be seen that a unidirectional crash force sensor is disclosed.

In a first or normal state, the cylindrical mass 300 is able to slide in the casing 302. The mass however, will not be able to slide totally forward so that the front of the mass would abut front wall 314 or against the cross braces attached to the outer wall of the casing as that motion is retarded by spring 312. In a second or emergency state, the reaction of the mass to a head-on crash is sufficient so that the force of the mass overcomes the resistant force of the spring. A back or other detent 322 is provided which protrudes inwardly from the casing and serves to constantly keep the cylindrical mass in contact with the spring 312. An electrical coil powered by an external power source can be provided to heat the unit in order to keep the materials and thus the friction coefficients at a relatively constant temperature.

In the preferred embodiment, a variable resistor 324 can provide a variable power signal emitter which serves to send signals to a control box 330. A pickoff 326, attached to the seismic mass 300, will move with the mass in response to a crash and will correspondingly send a signal through electrical connection 328 proportional to the rate of acceleration of the mass to a control box 330 such as an integrated circuit chip (IC) or to a control motor or relay. The control box 330 will activate the solenoid shown in the FIG. 3 to release the balloon distress signal and activate the electronic locator transmitter switch 332 in a voltagetime reaction. Electrical wires 334 connect the electronic locator transmitter switch to the electronic locator transmitter.

It can be seen that at zero acceleration, zero current will flow to the control box. When a shock due to impact is received, the casing lags behind the mass, and the pickoff 326 engages the electric resistor coil which is connected to a power source. The farther forward the mass slides, the greater the amount of current which flows to the control box.

There are several types of control boxes which could be employed. For example, the already mentioned integrated circuit chip (IC), will give a delayed reaction in response to a varied current reception. This time delayed reaction can be designed to coincide with any force-time relationship desired.

As a specific example of the activator, the device can be designed so that when a crash force of 3 Gs is received for a period of 6 seconds, the control box will activate the ELT. In the same manner, a force of 4 Gs sustained for 4 seconds would cause a higher voltage over the shorter period to activate the switch, etc. The device would still activate with an impact force of any desired number of Gs within a few milliseconds.

Figure 7:
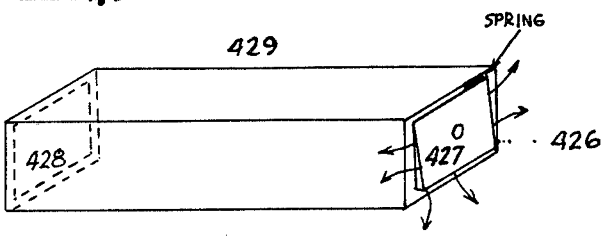
FIG. 7 is a perspective view of the crash force sensor shown in FIG. 6.

FIG. 7 discloses another feature of the preferred embodiment If some damping is desired on the return of the mass, the following alternate design may be incorporated into the invention.

The back end of the case 429 has a large opening 428 so that the forward motion of the mass would not be damped by restriction of the entering air.

A forward detent spring abuts against cross braces which are fastened to the outer walls of the case.

The leading end of the case 429 has one large one way valve and one small opening arranged in the following manner. The large valve 426 allows the air to rush out of the case unrestricted as the seismic mass slides forward under impact. As the mass pauses and begins to return to its original position the lightly spring loaded large one way valve 426 which may be hinged at the top closes. The much smaller opening 427 now restricts the flow of air in the opposite direction thus dampening its return motion.

In other words the large valve would allow unrestricted forward motion as the detent spring compresses but the small opening would restrict the air entering as the mass returned to its normal position. By adjusting the size of the small opening 427 any amount of return damping desired may be accomplished. The time-force activating relation would be adjusted accordingly.

This design gives additional resistance to extraneous vibrations or to surge due to vibration.

FIG. 6 discloses an alternate embodiment in which a casing 200 consists of 4 solid walls in an ordinary rectangular fashion. The casing encloses a seismic mass 202 which is also a rectangular shape. Friction pads 204 are attached to the sides, top and bottom walls of the seismic mass. Friction plates 206 also surround the seismic mass side, bottom and top walls yet are spaced apart from the seismic mass 202 by the aforementioned friction pads 204. Pressure plates 208 surround the friction plates 206 on the two side walls and the top and bottom walls. A thin elastic layer 209 is held between the walls of the casing 200 and the pressure plates 208. This elastic layer serves to keep the friction material in constant contact with the seismic mass. The widths of the materials are such that there is virtually no air space between any of the individual elements, i.e., the sum of the widths of the seismic mass, covered with friction pads, friction plates, and elastic layers is equal to the inner width of the case 200.

A large spring 212 is located between the seismic mass 202 and the front wall of the casing. A sensor or an activator line 214 is connected to the rear of the seismic mass. The other end of the line 214 is connected to a switch 216 which may activate the solenoid 500 to move in the direction indicated by arrow 502 to release the balloon distress signal; the switch 216 can also activate an electronic locator transmitter. A back stop 222 in the form of a peg is secured to one of the side, top, or bottom walls behind the rear of the seismic mass. The back stop insures constant contact between the mass and the spring 212. An alternate push button switch 224 (shown in phantom) may be located in an extending through the front wall of the casing 200.

In order to understand the function and operation of the different embodiments of the activators, "arrows" are shown in FIG. 6 to illustrate various force directions. Arrow 226 indicates the direction of travel and direction of reaction force of the seismic mass to the stock action of a head-on crash. The other arrows indicated in phantom lines will be discussed and more fully described subsequent to a description of the term "angle of repose".

All materials have an angle of repose. When material is resting against similar material it will not slide or move, no matter how great the force, unless the force is directed at an angle greater than the angle of repose for that material. The seismic mass, due to its being covered by friction pads, and surrounding by friction plates and pressure plates has its motion limited to one direction as indicated by arrow 226. Consequently, the mass 202 or 300 will not slide nor activate switch 216 or 330 unless the mass is subject to a large force at an angle greater than the angle of repose for the materials used.

The angles of repose for wood and for glass are illustrated by phantom arrows 228 and 230, respectively. Although not shown, the angles of repose for steel on steel and for aluminum on steel, lie between these two angles.

It is a known factor that the coefficient of friction is a constant for particular materials (the same force that makes the mass slide also presses the mass against the opposing friction material). There is, therefore, a limit to the size of the angle at which the mass will receive a force without moving, even though friction plates are pressed against the mass on all sides. As the friction plates are located on all sides, it does not matter what quadrant the shock force comes from as the mass will function in the same manner.

A heater and thermostat may be built into the device in order to prevent expansion or contraction of the materials which would cause pressure and frictional changes.

In summary, the operation of either of the crash force sensors proceeds as follows. If the pressure plates are held against the mass with just enough pressure to keep them in contact with the seismic mass then the mass will slide only when a shock is received from an angle which is greater than the angle of repose for the friction material used. After the seismic mass slides it will depress the forward spring and if the force exceeds the predetermined spring force the mass will activate the electronic locator transmitter switch in a time-force relationship.

Damping of the return motion of the seismic mass can be achieved as described in order to make the device resistant to extraneous vibration and to prevent surge in the detent spring.

It should now be obvious that a sensor is described for utilization with the previously described distress signal. The activator is designed so as to function within a narrow a degree of directional variation as desired.

The surface area of the seismic mass covered by the friction material can be reduced if less forward retention by the friction material is desired. This would not affect its function when the shock arrives from an angle less than the angle of repose for the particular friction material. The lateral pressure would only tend to increase the amount of pressure per square inch on the smaller friction interface. To briefly reiterate, the operation of this invention is in this manner. If the friction plates are held against the sides of the seismic mass with enough pressure to keep them in contact with the mass, then the mass will slide only when a shock is received from an angle which is greater than the angle of repose for the friction material used. For some friction materials this would give a very narrow unidirectionality. After the mass slides it then depresses the forward spring, and if the force exceeds the predetermined desired number of Gs, it activates the ELT switch.

In order to lessen the degree of unidirection and to widen the angle of the reactive cone, the friction surface may be lubricated. All friction materials have a much smaller coefficient of friction when lubricated, and a material can easily be chosen which will allow the mass to slide in reaction to shock from any angle desired.

When the shock arrives from an angle greater than the angle of repose for the material chosen, the apparatus could then be controlled merely by spring adjustment or spring size. Then by simple experimentation, one could arrive at the correct relationship of the resistance of the line which pulls the switch and the weight of the mass and the spring tension so that the right amount of G force will compress the spring sufficiently to trigger the switch. The switch itself should be of the resetable type so that the ELT may be turned off and reset by hand.

A spring of the same size as the one on the leading end of the mass can be placed on the following end and the acceleration switch will function the same if the plane comes in on its tail or nose. The angle of repose will remain the same regardless of the direction of shock.

For use with helicopters it is suggested that either of the designs shown in FIGS. 5 or 6 could be utilized in the following manner.

The described sensor should be mounted vertically on the helicopter and the friction material should have a very low frictional coefficient and could be lubricated. Babbit would be a good choice for the friction material.

This would give a very wide angle cone of possible reaction to a shock and would give the omnidirectional characteristics to the crash sensor needed in a helicopter crash. Again the mass could have a spring on each end.

The chief advantage of this crash sensor (all models) is that it will give the desired force-time-direction characteristics desired while being immune to extraneous vibration which is the chief fault of presently existing crash sensors.

While the preferred embodiment of the invention has been disclosed, it is understood that the invention is not limited to such an embodiment since it may be otherwise embodied in the scope of the appended claims.

What is claimed is:

1. A distress signal device comprising an inflatable balloon, release means connected to said balloon, said release means being removably mounted to a casing for separating from said casing when acted upon by a predetermined pressure, a tether line with one end attached to the balloon and its other end attached to said casing, a vial and a first reactant contained within said casing, said vial containing a second reactant, and activator means for breaking said vial which allows said first and second reactants to mix and generate gas within said casing, said gas building in pressure within said casing and escaping therefrom through an aperture in said casing adjacent to said release means and passing through said release means and entering and inflating said balloon through a check valve mounted on said release means, said gas building in pressure within said release means so that said release means separates from said casing when a predetermined pressure is reached, thereby allowing the balloon and said release means connected to said balloon to rise and travel away from said casing.

2. A distress signal device as claimed in claim 1 wherein said activator means comprises a pin axially aligned with an end of said vial, an activator knob which threadingly mates with the casing and is connected to said pin so that when the knob turned a predetermined distance the pin breaks the vial releasing said second reactant within, thus allowing the first reactant and second reactant to mix, thereby producing gas.

3. A distress signal device as claimed in claim 2 wherein said activator means comprises a pin axially aligned with one end of the vial, said pin being spring loaded, a line connected to the blunt end of said pin, the other end of said line being looped through an inclined leg of a support member attached to the inner wall of said casing and around a rod, and an initiation line connected to said rods so that upon pulling the initiation line the rod is removed from said loop allowing said spring loaded pin to break the vial allowing gas to be generated.

4. A distress signal device as claimed in claim 3 wherein a crash force sensor activator comprises a rectangular casing enclosing a rectangular seismic mass, said mass being covered with friction pads, friction plates positioned adjacent said friction pads and pressure plates positioned adjacent said friction plates, and a thin elastic layer surrounding said pressure plates so that the mass is firmly held between the casing walls yet able to slide forwardly and rearwardly within said casing, a spring loaded between said mass and the front wall of said casing, said sensor line being connected to the rear of said seismic mass so that the impact of a predetermined force from a designated direction will cause the seismic mass to slide in the casing against the force of said spring to pull the sensor line, said sensor line being connected to a switch, so that the seismic mass pulls the sensor line, the switch is pulled by the sensor line, said switch activating a solenoid adjacent to said casing, said solenoid pulling said initiation line so that said gas is generated.

5. A distress signal device as claimed in claim 4 wherein said initiation line is connected directly to said sensor line, so that movement of said seismic mass will pull said initiation line allowing said gas to be generated.

6. A distress signal device as claimed in claim 1 wherein said balloon releasing means comprises a cap with snap seal means, said snap seal means securing said cap and balloon to the distress signal device casing until said seal means is released.

7. A distress signal device comprising an inflatable balloon, release means connected to said balloon, said release means mounted to a casing, said release means comprising a cap and snap seal means, said cap being attached to said balloon, said cap being held to said casing by said snap seal means, so that said snap seal means will be broken and allow said cap to separate from said casing when pressure inside said cap reaches a predetermined level, a tether line with one end attached to the balloon and its other end attached to said casing, a vial and a first reactant located within said casing, said vial containing a second reactant, and activator means for breaking said vial which allows said first and second reactants to mix and generate gas within said casing to inflate the balloon, said activator means comprising a pin axially aligned with an end of said vial, said pin being spring loaded, a line connected to the blunt end of said pin, the other end of said line being looped through a slot in an inclined leg of a support member connected to the inner side wall of said casing and around a rod, a ball weight connected by a universal joint to the lower end of said rod, and coil springs located between the inner casing wall and said ball weight so that upon an impact of predetermined force the ball weight moves a sufficient distance to release said rod causing said pin to break said vial so that said gas is generated, said gas entering and inflating said balloon through said cap until gas pressure inside said cap reaches said predetermined level, said balloon being released from said casing by said release means thereby allowing the balloon and cap to rise and travel away from said casing.

8. A distress signal device comprising an inflatable balloon, a tether line with one end attached to the balloon, the other end attached to a device casing, a gas generating solution located within a container, said container being held in said casing, gas generator activator means mounted to said casing for breaking the wall of said container, said gas generator actuator means comprising a pin positioned perpendicular to the wall of said container, said pin being spring loaded, a line connected to the blunt end of said pin, the other end of said line being looped through a slot in an inclined leg of a support member attached to the inner side wall of said casing and around a cylindrical rod, a ball weight pivotable about a universal joint and connected to the lower end of said rod, and coil spring means located between the inner casing wall and said weight such that upon an impact of predetermined force the weight swings a sufficient distance to release said rod from said loop of wire allowing said spring loaded actuator pin to break said container wall and release said gas generating solution, a reacting compound located between the outer wall of said container and the inner wall of said casing so that upon activation the reactant mixes with the solution to produce a gas which inflates the balloon, said balloon being released after inflation from said casing by releasing means.

9. A distress signal device comprising an inflatable balloon, a tether line with one end attached to the balloon, the other end attached to a device casing, a gas generating solution held within a container, in a sealed relationship, said container being held in said casing, gas generator activator means mounted to said casing for breaking the wall of said container, a reacting compound located without said container and within said casing so that when the gas generator activator means breaks the wall of said container, the reacting compound mixes with the solution to produce a gas which inflates the balloon, passing through a one way check valve means mounted to said balloon, said balloon being released after inflation from said casing by a releasing means, said releasing means comprising cap means secured to said balloon, said cap means being removably mounted to said casing until a predetermined pressure of gas within said balloon causes separation of said cap means from said casing and its associated balloon.

10. A distress signal device as claimed in claim 9 wherein said gas generating solution is ammonium halide and said reactant is a metal hydride.

11. A distress signal device as claimed in claim 9 wherein said gas generator activator means comprises a pin perpendicular to said container, an actuator knob which threadingly mates with the device casing and is connected to said pin so that upon turning said knob a predetermined amount, the pin breaks the wall of said container thereby allowing the reactant to mix with the solution.

12. A distress signal device as claimed in claim 9 wherein said balloon is lined with foil to facilitate radar detection.

13. A distress signal device as claimed in claim 9 wherein said tether line is wrapped around a freely rotating spool which spool rotates around said inner casing to discharge said tether line in a tangle free manner.

14. A distress signal device comprising an inflatable balloon, a tether line with one end attached to the balloon, the other end attached to a device casing, a gas generator solution located within a container, said container being held in said casing, gas generator activator means mounted to said casing for breaking the wall of said container, said sensor means being connected by an activation line to a crash force sensor activator comprising a rectangular casing enclosing a rectangular seismic mass, said mass being covered with reaction pads, friction plates positioned adjacent said friction pads and pressure plates positioned adjacent said friction plates, and a thin elastic layer surrounding said pressure plates so that the mass is firmly held between the casing walls yet able to slide forwardly and rearwardly within said casing, spring means loaded between said mass and the front wall of said casing, said sensor line being connected to the rear of said seismic mass so that an impact of a predetermined force from a designated direction will cause the seismic mass to slide in the casing against the force of said spring means to pull the sensor line, a reacting compound located between the outer wall of said container and the inner wall of said casing so that upon activation the reactant mixes with the solution to produce a gas which inflates the balloon, said balloon being released after inflation from said casing by releasing means.

15. A distress signal device as claimed in claim 14 whrein said seismic mass is prevented from rearward movement in said casing by a back stop peg located behind said mass and attached to a wall of said casing.

* * * * *